(No Model.)

C. IVES.
NUT LOCK.

No. 414,708. Patented Nov. 12, 1889.

Witnesses.

Inventor.

UNITED STATES PATENT OFFICE.

CHARLES IVES, OF CLINTON, NEW YORK.

NUT-LOCK.

SPECIFICATION forming part of Letters Patent No. 414,708, dated November 12, 1889.

Application filed April 19, 1889. Serial No. 307,795. (No model.)

*To all whom it may concern:*

Be it known that I, CHARLES IVES, of Clinton, in the county of Oneida and State of New York, have invented certain new and useful Improvements in Bolts and Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in bolts and combined bolt and nut-lock.

Figure 4:
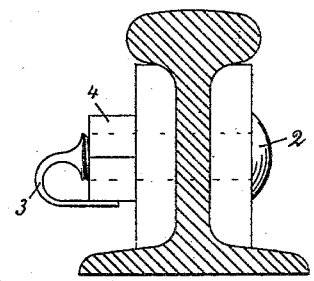
Figure 3:
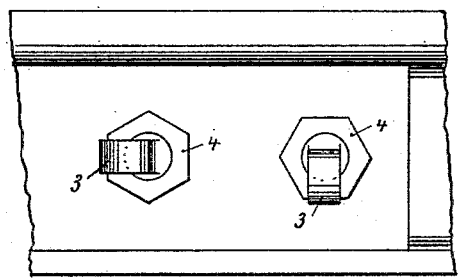
Figure 1:
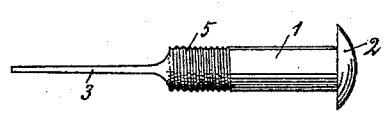
Figure 2:
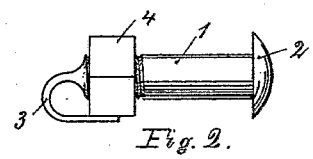

In the drawings which accompany and form part of this specification, and in which like figures and letters of reference refer to like parts in the several views, Figure 1 shows my improved bolt. Fig. 2 shows the same with a nut applied and the locking device applied; Figs. 3 and 4, manner of applying to a railway-rail.

Referring to the drawings, 1 indicates the bolt; 2, the head of the bolt. 3 is a prong constructed integral with the bolt and projecting from the screw-threaded end thereof. The prong 3 may be round or flat or of any convenient shape, but is preferably of small diameter or thin and narrow as compared to the bolt. 5 is the screw-thread upon which the nut is applied, and 4 is the nut.

In using my improved bolt the bolt, with the nut removed and the prong projecting in substantially straight line from the end of the bolt, as shown in Fig. 1, may be passed through any opening in which the bolt is to be used and the nut applied and screwed up, as desired. Then the prong 3 is bent around, as shown in Figs. 2, 3, and 4, so as to engage the side of the nut and prevent the rotation of the nut upon the bolt.

While I have shown the bolt applied to a railway-rail, I do not mean to limit myself thereby, but only illustrate one manner of using it, for it is adapted to be used in any place where bolts are used.

What I claim as new, and desire to secure by Letters Patent, is—

As a new article of manufacture, a screw-threaded bolt constructed with a flexible prong integral with the bolt and projecting laterally from the center of the screw-threaded end thereof, and of sufficient length to engage when bent the side of a nut applied upon the screw-threaded end of the bolt, substantially as set forth.

In witness whereof I have affixed my signature in presence of two witnesses.

CHARLES IVES.

Witnesses:
  L. S. CLARKE,
  M. E. ROBINSON.